UNITED STATES PATENT OFFICE.

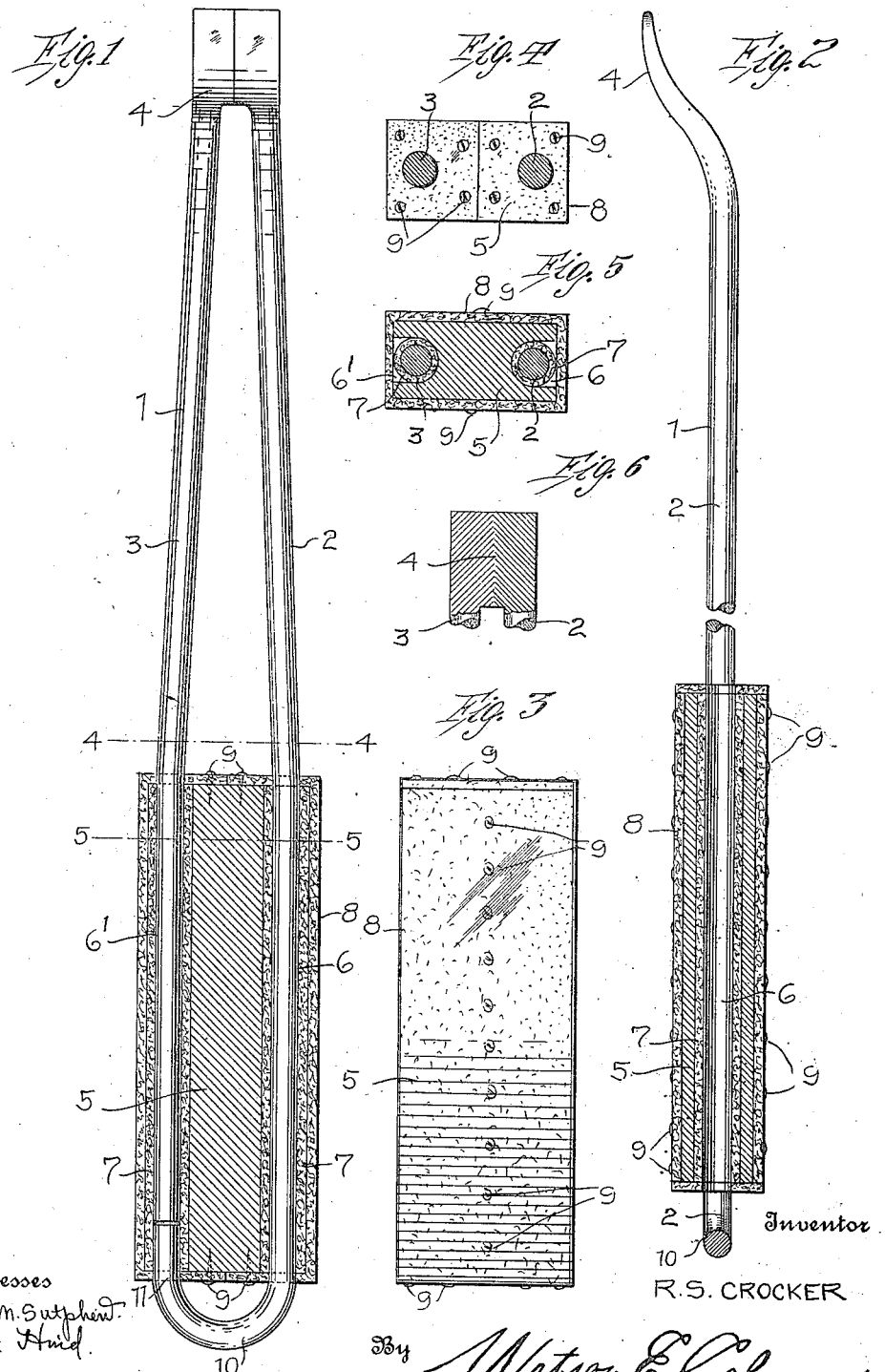

RAY S. CROCKER, OF WELLINGTON, OHIO.

LIFTER.

1,060,167.

Specification of Letters Patent.　　Patented Apr. 29, 1913.

Application filed November 27, 1912.　Serial No. 733,842.

*To all whom it may concern:*

Be it known that I, RAY S. CROCKER, a citizen of the United States, residing at Wellington, in the county of Lorain and State of Ohio, have invented certain new and useful Improvements in Lifters, of which the following is a specification, reference being had to the accompanying drawings.

This invention relates to improvements in lifters and more particularly to a stove lid lifter, and an object thereof is the provision of a device of this character in which the handle of the lifter is insulated from the body portion thereof whereby heating of the handle is prevented.

A further object of this invention is the provision of a stove lid lifter in which the body portion of the lifter is formed of metal, and the handle thereof is wood, the wooden handle of the lifter being insulated from the body portion thereof.

With these and other objects in view, my invention resides in the novel constructions and arrangements of parts, to be hereinafter more fully described, claimed and illustrated in the accompanying drawing in which, Figure 1 is a top plan view of my invention showing the handle thereof in section. Fig. 2 is a longitudinal section of my device. Fig. 3 is an elevation of the handle. Fig. 4 is a section taken on line 4—4, Fig. 1. Fig. 5 is a section taken on line 5—5, Fig. 1. Fig. 6 is a sectional elevation of the lip or tongue of my device.

Referring more particularly to the drawing, the numeral 1 designates generally my improved lifter, which comprises a pair of metallic rods 2 and 3, the rods being enlarged and connected at the forward ends thereof to form a lid or tongue 4 for engagement in the recess of a stove lid. A handle 5 is formed of a rectangular block of wood, which is provided with longitudinally extending grooves 6 and 6' in the opposite side faces thereof.

The rods 2 and 3 diverge rearwardly for a portion of their length and thence extend parallel with each other as clearly disclosed in the drawing. Sleeves 7 of asbestos or other insulating material are disposed on the parallel portions of the arms 2 and 3, the sleeves being of relatively the same length as the handle and the portions of the rods carrying the sleeves 7 being adapted for engagement in the grooves 6 and 6' of the handle, whereby the handle will be insulated from the rods. A cover 8 which is also insulating material, such as asbestos or the like is disposed entirely around the handle and is secured thereto by nails 9, or other similar fastening devices. The rod 2 is of relatively greater length than the rod 3 and projects rearwardly from the handle and is curved as at 10, and bent downwardly as at 11 into the groove 6' of the handle. It will be seen that the curved portion 10 of the rod 2 provides a hook, by which the lifter may be suitably suspended when not in use.

It is apparent that the handle is rigidly connected to the rods 2 and 3, and is prevented from longitudinal movement thereon, by reason of the extremities of the diverging portions of the rods engaging with the forward end of the handle, and the engagement of the curved portion 10 of the rod 2 with the rear end of the handle.

From the above description taken in connection with the accompanying drawing, it will be seen that I have provided a stove lid lifter which is capable of being readily assembled, which is simple in construction and which may, therefore, be cheaply manufactured and one which is so insulated that the handle of the device will always remain cool. It will, of course, be understood that the device may be used to carry different cooking articles from place to place, and if desired the tongue or lip 4 of the lifter may be of any desired shape to engage the openings of different shapes in the articles to be carried.

Having thus fully described this invention, what I desire to claim and secure by Letters Patent is:—

1. A stove lid lifter comprising a pair of rods which are connected at one end to form a lip, a handle having longitudinal grooves formed in its opposite sides for the reception of said rods, means for insulating said handle from said rods, and one of said rods being relatively longer than the other and curved to project within the groove of the other rod substantially as described.

2. A device of the character described comprising rods connected at one end to form a lip, sleeves of insulating material disposed on the opposite ends of said rods, a handle having longitudinal grooves in the opposite sides thereof, the sleeved portions of said rods being adapted for engagement in the grooves of said handle, substantially as described.

3. A lifter of the character described comprising a pair of rods connected at one end to form a lip, sleeves of insulating material disposed on said rods at the opposite ends thereof, a handle having longitudinal grooves in its opposite sides, the sleeved portions of said rods being adapted for engagement in the grooves in said handle, and a collar of insulating material entirely covering said handle, substantially as described.

4. A device of the character described comprising a pair of diverging rods, said rods being connected at one end to form a lip, sleeves of insulating material disposed on the opposite ends of said rods, a handle having longitudinal grooves formed in its opposite sides, the sleeve portions of said rods being adapted for engagement in the grooves in said handle, and one of said rods being relatively longer than the other and curved to project within the groove of the other rod substantially as described.

5. A device of the character described comprising a pair of spaced rods connected at one end to form a lip, sleeves of insulating material disposed on the opposite ends of said rods, a handle having longitudinal grooves in the opposite sides thereof, the sleeved portions of said rods being adapted for engagement in the grooves of said handle, and said sleeves being of substantially the same length as the handle, substantially as and for the purpose described.

6. A device of the character described comprising a pair of rods connected at one end to form a lip, sleeves of insulating material mounted on the opposite ends of said rods, a handle having longitudinal grooves in the opposite sides thereof for the reception of the sleeved portions of said rods, said rods diverging rearwardly from said lip to said handle, as and for the purpose described.

7. A device of the character described, comprising spaced rods having a lip, a handle having longitudinal grooves in the opposite sides thereof mounted on said rods, said rods adapted to engage in said grooves, and means for insulating said handle from said rods, as and for the purpose described.

8. A device of the character described comprising spaced rods having a lip, a handle having longitudinal grooves formed in its opposite sides for the reception of said rods, one of said rods terminating short of the end of the handle, and the other of said rods being relatively longer than the first mentioned rod and being curved and projecting within the groove of the first mentioned rod, substantially as and for the purpose described.

In testimony whereof I hereunto affix my signature in the presence of two witnesses.

RAY S. CROCKER.

Witnesses:
 ROBERT L. WALDEN,
 ELLA J. GOSLING.